United States Patent Office

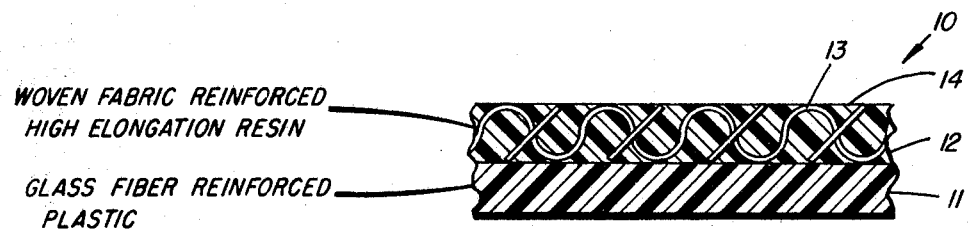

3,506,531
Patented Apr. 14, 1970

3,506,531
EROSION RESISTANT REINFORCED PLASTIC CONSTRUCTION
Maxwell Stander, Silver Spring, Md., assignor to the United States of America as represented by the Secretary of the Navy
Filed Jan. 26, 1967, Ser. No. 612,300
Int. Cl. B32b 5/02
U.S. Cl. 161—82                                 1 Claim

ABSTRACT OF THE DISCLOSURE

A technique for rendering reinforced plastic constructions effectively immune to erosion caused by impinging rain drops, dust particles, sleet, sand, etc. An outer protective reinforced plastic layer, consisting of a woven nylon or Dacron fabric reinforced, high elongation resin (epoxy-polyamide or epoxy-polysulfide, for example), is applied to the plastic construction.

BACKGROUND OF THE INVENTION

The present invention relates generally to erosion resistant reinforced plastic constructions and, more particularly, to weatherable glass fiber-reinforced plastic constructions immune to the deteriorating effects of sand, rain, sleet and other causes of erosion.

It has been long known that reinforced plastics have enjoyed widespread application as structures such as radomes, fairings, etc., because of their durability, high strength-to-weight ratio, comparatively low cost, moldability and high frequency radiation transparency. But, because they are weather exposed in environments of aircraft traveling at supersonic speeds, they offer poor resistance to erosion, caused principally by impinging rain drops and by dust particles, sleet and sand. These reinforced plastics are being also currently used in various leading edge constructions such as helicopter rotor wing blades, aircraft wings, hydrofoils and sonar domes which are today highly susceptible to erosion and delamination as aircraft and water craft speeds have increased. These inherent deficiencies of the glass fiber-reinforced plastics may be manifested by the capacity of the eroding particles to induce high impact and shear stresses that will cause delamination and damage, or, surface erosion of the reinforced plastic will result in the rising of the reinforced fibers near the surface to provide paths for the ingress of water or other materials into the body of the structure. Attempts to cure these deficiencies have included coating of the outer surfaces with a protective layer of neoprene or urethane, but, due to their short service life and the application problems involved, intact coating in service is made extremely difficult to maintain without resorting to impractical maintenance procedures. Failure of the underlying structure or laminate has been found to quickly follow coating failure. Furthermore, upon initial application and when re-applying the prior art protective coatings after significant wear, appreciable drying time is required between applied coats which are brushed-on the plastic construction.

SUMMARY OF THE INVENTION

An outer protective layer comprising a woven fabric reinforced, high elongation resin is applied to a plastic construction for rendering it substantially resistant to erosion. The fabric, which may be of nylon or Dacron, is impregnated with a polymerizable, cross-linked, flexibilized epoxy resin such as epoxy-polyamide, epoxy-polysulfide or epoxy-polyglycol diepoxide.

It is accordingly an object of the present invention to provide a technique for good surface protection of reinforced plastics against the damaging effects of erosion.

Another object of the present invention is to obtain radome and leading edge reinforced plastics with improved durability under high speed flight through rain and other weather elements.

Other objects and advantages of the present invention will become apparent from the following description of the invention with a more complete understanding thereof being had upon reference to the accompanying drawing showing the weatherable glass fiber-reinforced plastic panel made according to this invention.

BRIEF DESCRIPTION OF THE PREFERRED EMBODIMENTS

In the drawing, numeral 10 designates the weatherable panel construction according to the present invention which consists initially of a fiber-reinforced plastic backing 11 of any well-known state-of-the-art resin such as the epoxy, phenolic or polyester type preferably utilizing glass reinforcing fibers, or, in the alternative, asbestos fibers. The selected fiber-reinforced plastic structure 11, in serving as a radar dome or in leading edge constructions as hereinabove mentioned, may comprise either woven or non-woven reinforcing fibers. The outer surface of this structure is protected by a layer 12 of a woven fabric 13 reinforced high elongation resin 14. The resin system is a polymerized, cross-linked, flexibilized epoxy resin consisting of an epoxy-polyamide or an epoxy-polysulfide resin. The epoxy, as is generally recognized in the art, is based on the diglycidyl ether of bisphenol-A. This is combined or co-reacted with a poly-functional flexibilizer such as a polyamide or a polysulfide. The polyamide acts as a reactive cross-linking agent for a liquid epoxy resin as well as a flexibilizer. The class of flexibilizing compounds of interest are the modified aliphatic amines consisting of the condensation product of dimerized fatty acids and a difunctional amine such as ethylene diamine. The proportions of polyamide to epoxy range between 25–75% of epoxy resin, by weight, in polyamide mix. Cure and hardening results from the reaction of the free amine groups with the epoxy groups, as is the case with the conventional primary and secondary polyfunctional amines. As is well known, a portion of the polyamide may be replaced by an aromatic amine to increase the heat distortion temperature.

The polysulfide polymers combinable with the liquid epoxy resin are those comercially available as viscous, colorless, clear liquids having a molecular weight in the range of 500–1000. The curing reaction between the polysulfide and the epoxy, as is well recognized, is by addition. Upon further reaction with a curing agent such as the primary, secondary or tertiary aliphatic polyamines or anhydrides, cross-linking and hardening take place. Proportions of polysulfide to epoxy desirable for the purpose range between 25–50% polysulfide by weight.

It should be understood that flexibilization of the epoxy is not limited to the above systems but may, for example, be accomplished by combining the epoxy with polyglycol diepoxides and subsequently curing it with a suitable amine or acid anhydride curing agent.

The woven fabric 13 used to reinforce this flexibilized resin system 14 consists of a standard weave cloth of either a long-chain synthetic polyamide, commonly known as nylon, or of a polyester fiber melt-spun from polyethylene terephthalate, commonly known as Dacron. The fabric 13 is impregnated with the high elongation resin 14 and may be subsequently wound onto the back-up structure 11 in accordance with conventional filament winding techniques after the winding of the radome fibers is completed. The entire unit 10 may then be cured in a single operation under appropriate conditions of temperature and pres-
} sure in order to form a single homogeneous unit. Should the outer layer 12 wear to any appreciable degree during service of the structure 10, the elastomer 14 of uncured epoxy-polyamide or epoxy-polysulfide or its equivalent, may be reapplied to layer 12 and subsequently cured.

From the foregoing, it becomes apparent that a novel technique in protecting a fiber glass back-up structure has been devised wherein a flexibilized resin system is employed in which its inherent rubber-like properties respond elastically to impinging rain drops or other damaging weather conditions thereby rendering the fiber-reinforced substrate substantially immune to erosion. The desirable mechanical properties of the glass fabric remain, on the other hand, basically undisturbed. The instant invention also permits dramatic savings in cost and time to say nothing of the ease in assembly and simplicity in application. Furthermore, the instant protective coating, because it is applied from a solventless system, enjoys an important advantage over brush-on coatings that require appreciable drying time between applied coats.

Obviously many modifications and variations of the present invention are possible in the light of the above teachings. It is therefore to be understood that within the scope of the appended claim the invention may be practiced otherwise than as specifically described.

What is claimed is:

1. In an erosion resistant material composed of a substrate of glass or asbestos fiber reinforced plastic which is used in environments subjecting it to high speed contact with impinging particles of rain, dust, sleet, sand, and the like, the improvement comprising: utilizing as the surface layer of said material, which layer directly contacts said particles, layer of woven fabric selected from the group consisting of long-chain synthetic polyamide and melt spun polyethylene terephthalate, said fabric impregnated with a polymerizable, crosslinked, flexibilized epoxy resin selected from the group consisting of epoxy-poly amide, epoxy-polysulfide and epoxy-polyglycol di-epoxide, said surface layer bonded directly to said substrate whereby said surface layer prevents erosion damage to said substrate.

References Cited

UNITED STATES PATENTS

| | | | |
|---|---|---|---|
| 3,299,169 | 1/1967 | Smith | 260—830 |
| 3,152,949 | 10/1964 | Guthrie | 161—92 |
| 2,994,940 | 8/1961 | Ferrell | 161—92 |
| 2,705,223 | 3/1955 | Renfrew et al. | 260—18 |
| 2,625,499 | 1/1953 | Nebesar | 161—95 |
| 3,300,369 | 1/1967 | Burkley et al. | 161—184 |

ROBERT F. BURNETT, Primary Examiner

M. A. LITMAN, Assistant Examiner

U.S. Cl. X.R.

161—93